United States Patent [19]

Hughes-Hartogs

[11] Patent Number: 6,111,935
[45] Date of Patent: Aug. 29, 2000

[54] ADAPTIVE EXPANSION TABLE IN A DIGITAL TELEPHONE RECEIVER

[75] Inventor: Dirk Hughes-Hartogs, Morgan Hill, Calif.

[73] Assignee: Canon Kabushiki Kaisha, Tokyo, Japan

[21] Appl. No.: 08/867,259

[22] Filed: Jun. 2, 1997

Related U.S. Application Data

[63] Continuation-in-part of application No. 08/444,192, May 18, 1995, Pat. No. 5,652,782, which is a continuation of application No. 08/143,861, Oct. 27, 1993, abandoned.

[51] Int. Cl.$^7$ .................................................. H04M 1/24
[52] U.S. Cl. ........................... 379/27; 379/388; 379/414; 379/28; 379/165; 379/377; 370/202; 375/254
[58] Field of Search ................................. 379/27, 28, 97, 379/1, 98, 93.09, 165, 204, 219, 377, 414, 388, 390, 396; 341/138; 370/202, 466, 261, 328, 338, 522, 468, 495, 526; 375/249, 254

[56] References Cited

U.S. PATENT DOCUMENTS

| | | | |
|---|---|---|---|
| 4,495,620 | 1/1985 | Steele et al. | 370/118 |
| 4,595,907 | 6/1986 | Huffman et al. | 340/347 |
| 4,620,294 | 10/1986 | Leung et al. | 364/900 |

(List continued on next page.)

FOREIGN PATENT DOCUMENTS

| | | | |
|---|---|---|---|
| 0 447 212 A1 | 9/1991 | European Pat. Off. | H04N 7/14 |
| 0 473 116 A2 | 3/1992 | European Pat. Off. | H04N 1/00 |
| 58-164396 | 9/1983 | Japan | H04Q 11/04 |
| 1109945 | 4/1989 | Japan | H04M 1/00 |
| 2026426 | 1/1990 | Japan | H04B 14/04 |
| 2192254 | 7/1990 | Japan | H04M 1/00 |
| 3101315 | 4/1991 | Japan | H03M 1/38 |
| 4129465 | 4/1992 | Japan | H04M 11/00 |
| 4225650 | 8/1992 | Japan | H04N 29/00 |
| WO 93/23809 | 11/1993 | WIPO | G06F 13/00 |

OTHER PUBLICATIONS

CCITT, Recommendation G.711, Pulse Code Modulation (PCM) of Voice Frequencies, 1972, Geneva, Switzerland.
CCITT, Recommendation G.712, "Performance Characteristics of PCM Channels Between 4–Wire Interfaces at Voice Frequencies", 1972, Geneva, Switzerland.
CCITT, Recommendation G.713, "Performance Characteristics of PCM Channels Between 2–Wire Interfaces at Voice Frequncies", 1984, Malaga–Torremolinos, Spain, amended at Melbourne, Australia, 1988.

*Primary Examiner*—Curtis A. Kuntz
*Assistant Examiner*—Rexford N. Barnie
*Attorney, Agent, or Firm*—Fenwick & West LLP

[57] ABSTRACT

A digital telephone (60) comprises send equipment (40) and receive equipment (50), coupled via a signal splitter/combiner (61) onto a digital telephone line (62) for communication with a remote party (90). The send equipment (40) comprises an A-law map (12) and a mu-law map (43). Receive equipment (50) comprises an inverse A-law map (14) and an inverse mu-law map (52). Maps (12,43) are selectable by the user (80). Similarly, inverse maps (14,52) are also selectable by the user (80). Receive equipment (50) may further comprise an un-quick-fix module (55) for removing unwanted insertions of quick fixes (25) inserted into the telephone line (62) by international telephone companies. Receive equipment (50) may further comprise a digital signal processor (57), computer (56), a set of pre-stored templates (58) corresponding to possible incoming telephone characteristics, and a caller parameter decipher module (51). In a preferred embodiment of a digital telephone receiver (50), an adaptive expansion table (95) is used to expand the digital signal at the receiver (50) from a relatively coarse resolution to relatively fine resolution. The configuration of the adaptive expansion table (95) is commanded by a control computer (99). Computer (99) is responsive either to a human control operator (80) or to statistics gathered by a statistics gathering module (97). The set of statistics to be gathered by the module (97) can be established by configuring a set of voice and data parameters (98).

24 Claims, 4 Drawing Sheets

U.S. PATENT DOCUMENTS

| | | | |
|---|---|---|---|
| 4,658,398 | 4/1987 | Hsing | 370/62 |
| 4,661,946 | 4/1987 | Takahashi et al. | 370/58 |
| 4,805,167 | 2/1989 | Leslie et al. | 370/84 |
| 4,823,342 | 4/1989 | Morita et al. | 370/109 |
| 4,850,011 | 7/1989 | Delmege et al. | 379/157 |
| 4,903,247 | 2/1990 | Van Gerwen et al. | 367/135 |
| 4,912,758 | 3/1990 | Arbel | 379/388 |
| 5,033,062 | 7/1991 | Morrow et al. | 375/7 |
| 5,050,005 | 9/1991 | Kagami | 358/434 |
| 5,150,048 | 9/1992 | McAuliffe et al. | 324/158 |
| 5,172,410 | 12/1992 | Chace | 379/388 |
| 5,195,132 | 3/1993 | Bowker et al. | 379/410 |
| 5,239,542 | 8/1993 | Breidenstein et al. | 370/79 |
| 5,243,342 | 9/1993 | Kattemalalavadi et al. | 341/106 |
| 5,265,127 | 11/1993 | Betts et al. | 375/39 |
| 5,274,703 | 12/1993 | Haughton et al. | 379/401 |
| 5,392,284 | 2/1995 | Sugiyama | 370/84 |
| 5,579,369 | 11/1996 | Feiner et al. | 379/22 |

ADAPTIVE EXPANSION TABLE IN A DIGITAL TELEPHONE RECEIVER

RELATED APPLICATIONS

This application is a continuation-in-part of U.S. patent application Ser. No. 08/444,192 filed on May 18, 1995, now U.S. Pat. No. 5,652,782, which application is a continuation of U.S. patent application Ser. No. 08/143,861 filed on Oct. 27, 1993, now abandoned.

TECHNICAL FIELD

This invention pertains to the field of digital telephone communications, and particularly to apparatus and methods for minimizing distortion in digital telephone receivers and for overcoming incompatibilities in international digital telephone standards.

BACKGROUND ART

Background references include the following U.S. Pat. Nos.: 4,805,167; 5,050,005; and 5,150,048. The CCITT/ITU standard entitled "Recommendation G.711—Pulse Code Modulation (PCM) of Voice Frequencies" (Geneva 1972) illustrates the operation of A-law and mu-law, which are differing compression maps used by differing countries. A partial solution to A-law/mu-law incompatibility has been introduced by certain international carriers and is subsequently described. In addition, the idea of making a telephone transmission "better" or "more pleasing" has been implemented by AT&T in "True Voice", in which the lower voice frequencies are accentuated and the overall signal is amplified 4 dB. True Voice is described in U.S. Pat. No. 5,195,132.

DISCLOSURE OF INVENTION

The present invention is an apparatus and method for minimizing distortion in a digital telephone receiver (50). Said receiver (50) comprises an adaptive expansion table (95) having as an input a first digital signal with relatively course resolution and having as an output a second digital signal with relatively fine resolution. Coupled to the adaptive expansion table (95) is a control computer (99) adapted to change the configuration of the adaptive expansion table (95).

The telephone end user (80) can overcome incompatibility between a first telephone system using A-law and a second telephone system using mu-law when communicating with a remote party (90), by means of determining the law that the remote party (90) is using, and selecting at the user digital telephone (60) a pair of maps (12,14 or 43,52) corresponding to the law used by the remote party (90).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1:
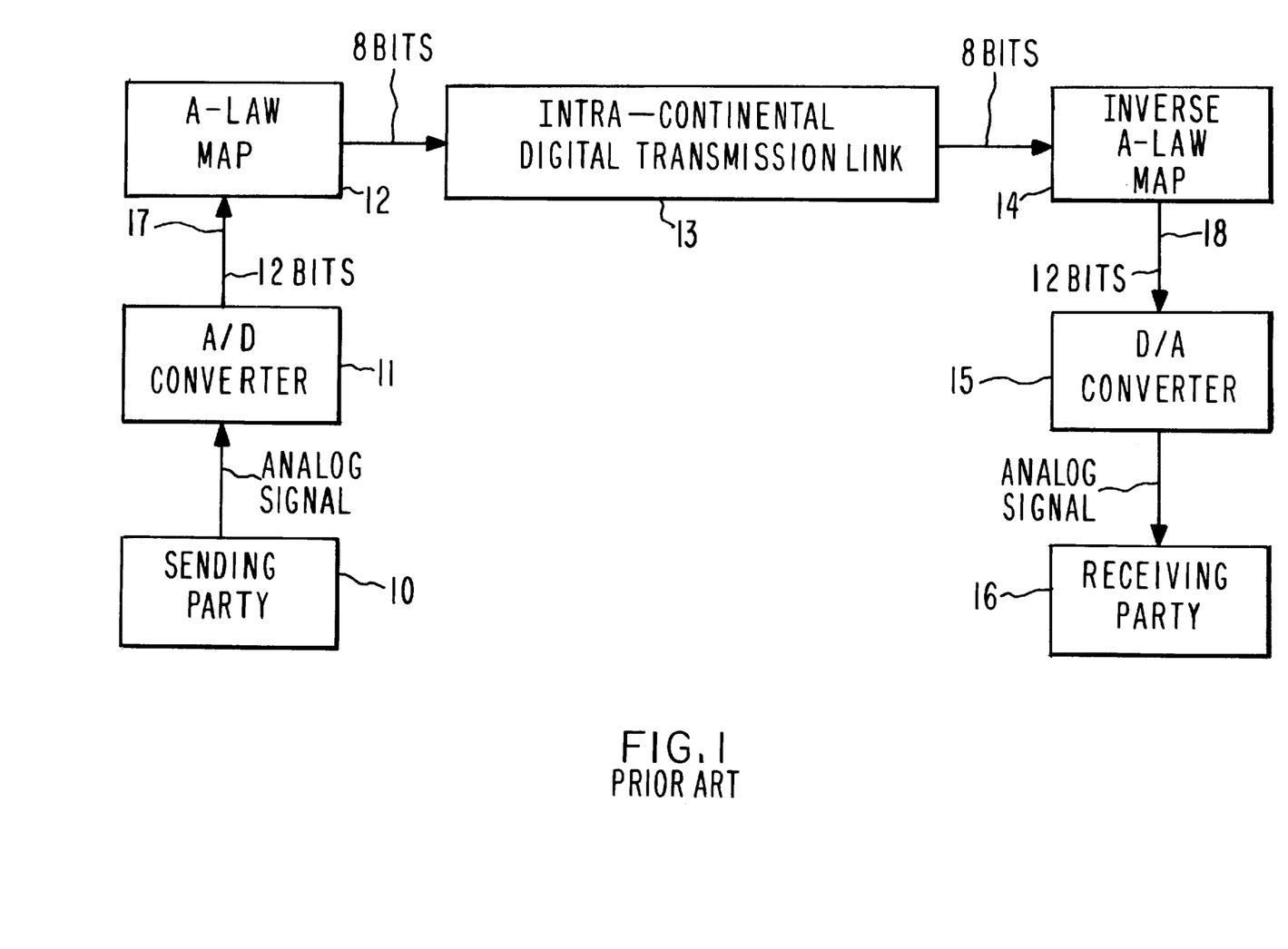
FIG. 1 is a block diagram illustrating a prior art system for handling intracontinental digital telephone calls.

FIG. 1 illustrates the existing system for handling digital telephone communications in Europe. It is assumed that the sending party 10 is equipped with a conventional analog telephone. The analog signals emanating from the sending party telephone 10 are converted by a (typically 12-bit) analog-to-digital (A/D) converter 11. The output of converter 11 is fed to a non-linear (monotonic and approximately logarithmic) map 12 of the digitized value to an 8-bit representation. This compression map 12 is called the A-law, the standard in place in Europe, as promulgated by international political authorities. The A-law is defined in the aforecited CCITT/ITU reference. 8,000 of these 8-bit representations are transmitted every second via an intracontinental digital transmission link 13. A-law map 12 advantageously allows for a reduced bandwidth in transmission link 13, because the output of map 12 has a coarser resolution than its input (i.e., a smaller number of bits characterizes the output signal). The trade-off, however, is additional unwanted distortion.

It is assumed that the receiving party 16 is similarly equipped with a conventional analog telephone. The 8 bits emanating from digital transmission link 13 are converted by an inverse A-law map 14 back to a 12-bit format, whereupon they are converted to analog form by digital-to-analog (D/A) converter 15 and processed by the receiving equipment at the receiving party 16. Inverse A-law map 14 is also an invariant map promulgated by the CCITT/ITU. Converters 11 and 15 have 8,000 per second sampling rates, according to the international standard.

In general, the 12-bit digital stream 17 leaving converter 11 is not identical to the 12-bit digital stream 18 entering converter 15. Typically, each particular value represented by bit stream 18 is approximated by the average of all values of bit stream 17 that map to that value. The values on bit stream 18 are typically chosen from a smaller set than the values on bit stream 17, i.e., there is less resolution in bit stream 18 than in bit stream 17. This is due to the nature of the A-law map 12 and the inverse A-law map 14: A-law map 12 is logarithmic, because it was designed with the goal of maintaining the signal to distortion ratio at between 30 dB and 35 dB over a wide dynamic range. The reason for this design goal is to roughly equalize the perceived distortion for speakers who speak at different volume levels (from loud to whisper) for various types of user equipment 10,16. The human ear is normally more tolerant of noise at a given level than of distortion at a lower level.

Distortion is unfortunately introduced because of the digitization process, and more particularly because the 8-bit representation describes only a subset of all the 12-bit values 17 resulting from the digitization by converter 11.

FIG. 1 illustrates A-law, the European standard. In the United States and Japan, on the other hand, a different law is used for converting from the 12-bit representation to the 8-bit representation. This law is called the mu-law, and is likewise defined in said CCITT/ITU reference. The A-law and the mu-law are not compatible. Therefore, connections between users 20,30 (FIG. 2) crossing the mu-law/A-law boundary result in additional distortion of the telephone signal. If these differences are ignored, and the values of one system are decoded using the decoding map of the other system, the result is a shift in signal level and distortion of small signals.

Figure 2:
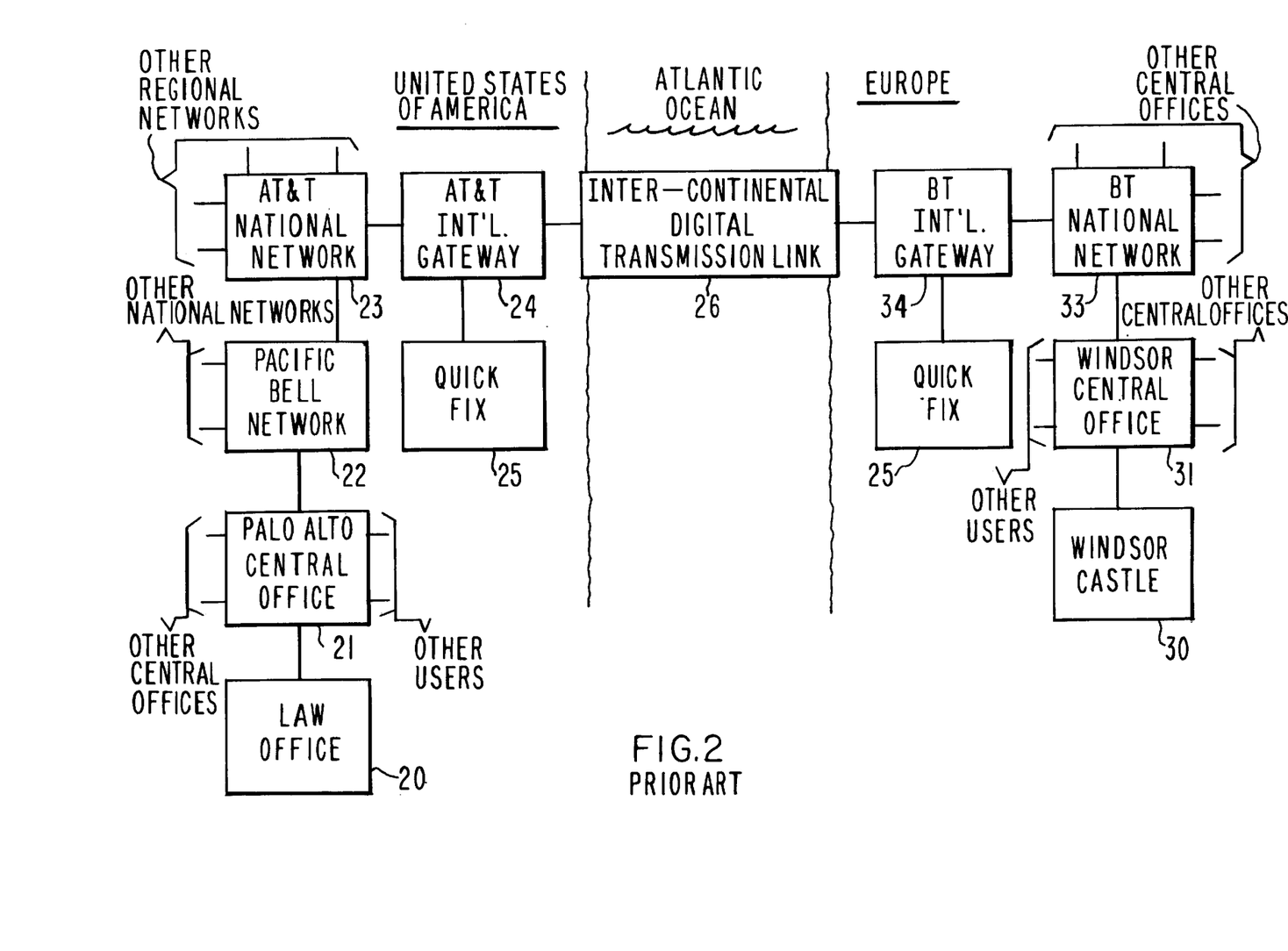
FIG. 2 is a block diagram illustrating a prior art system for handling intercontinental digital telephone calls.

FIG. 2 illustrates such a system, where an intercontinental digital transmission link 26 is used to convey digital telephone signals from the U.S.A. to Europe and vice versa. Link 26 may be a cable underneath the Atlantic Ocean or a satellite link. for example. At either end of link 26 is an international gateway. For purposes of illustration, FIG. 2 shows these to be an AT&T international gateway 24 in the case of the United States, and a British Telecom international gateway 34 in the case of Europe. Signals from each international gateway 24,34 are fed to a national network. FIG. 2 illustrates this as being the AT&T national network 23 in the case of the United States, and the British Telecom national network 33 in the case of Europe.

National network 23 connects several regional networks, including Pacific Bell network 22. Pacific Bell network 22 connects to other national networks, such as MCI and Sprint, which are interexchange carriers similar to AT&T, and to MCI's and Sprint's international gateways and intercontinental digital transmission links. Pacific Bell network 22 also connects to a plurality of central offices in various cities served by the regional network 22, for example, the illustrated Palo Alto, Calif. central office 21, one of two such central offices located in the bustling metropolis of Palo Alto. Central offices 21 are interconnected through the regional network 22 and sometimes directly.

An attorneys' office 20 in Palo Alto, Calif. is illustrated as being one of the many users that is connected to the Palo Alto central office 21, in this case via one to two miles of wires strung on telephone poles using well-known technology.

In England, there are no regional telephone networks. Rather, national network 33 is connected to a plurality of interconnected central offices including Windsor central office 31 as illustrated in FIG. 2. Windsor Castle 30 is one of a plurality of users coupled to Windsor central office 31, in this case by several miles of telephone wires strung on poles. The Windsor central office 31 is also connected directly to a plurality of other central offices.

Relatively sophisticated international telephone companies use what will be referred to herein as a "quick fix" 25 for attempting to overcome the incompatibilities between the A-law and the mu-law systems. The "quick fix" 25 is a map which maps from each value in one system to the closest value of the other system, then converts each sample by adding a positive or negative integer, normally +1, 0, or −1. This method is sanctioned by the CCITT/ITU and is defined in Tables 3 and 4 of the aforecited CCITT/ITU reference. However, this quick fix 25 is not an ideal A-law/mu-law conversion and fails to remove all distortion resulting from A-law/mu-law incompatibility. Furthermore, quick fix 25 has to be added to all international telephone calls that cross an A-law/mu-law boundary.

Figure 3:
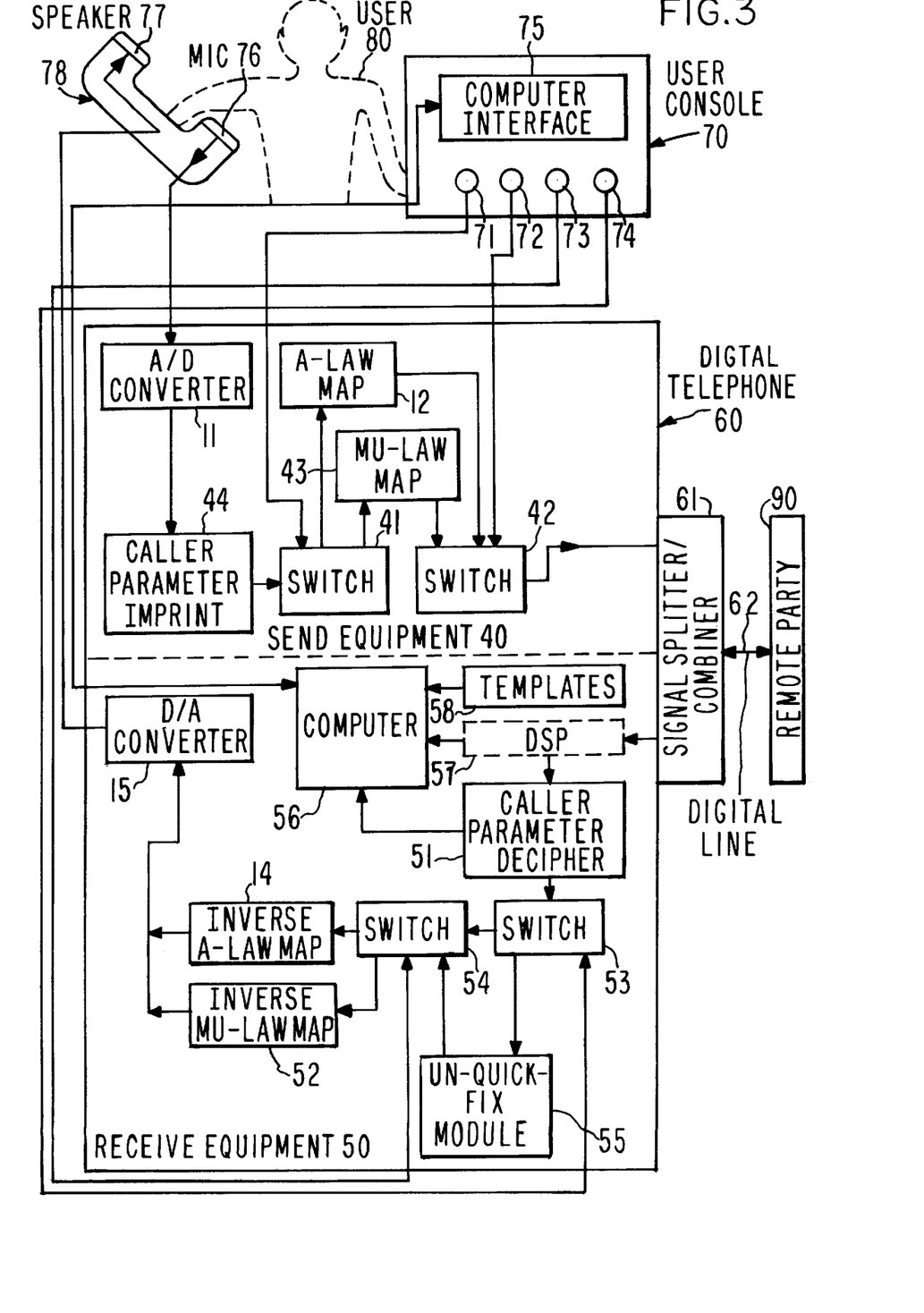
FIG. 3 is a block diagram illustrating digital telephone 60, user console 70, and handset 78 of a preferred embodiment of the present invention.

FIG. 3 illustrates a preferred embodiment of the present invention, which remedies the aforementioned incompatibilities in international telephone systems. Digital telephone 60 is located at the last (in the direction of telephone end user 80) point in the digital link 62 that emanates from the remote party 90. Telephone 60 may be an ISDN (Integrated Services Digital Network) telephone.

The equipment available to user 80 comprises digital telephone 60, handset 78, and console 70. Digital telephone 60, user console 70, and handset 78 may be separate units or they may be combined into one or two units. Digital telephone 60 comprises send equipment 40 and receive equipment 50, linked together by signal splitter/combiner 61 for coupling to digital line 62 on the way to remote party 90.

User console 70 is coupled to digital telephone 60 and comprises a computer interface 75, e.g., a video display for communicating the contents of computer 56 to user 80. User console 70 also comprises a set of four user activated binary switches 71,72,73, and 74.

Handset 78 is coupled to digital telephone 60 and comprises analog microphone 76 and analog speaker 77.

Microphone 76 is coupled to analog-to-digital (A/D) converter 11 within send equipment 40. The output of A/D converter 11 is fed to a caller parameter imprint module 44, where various characteristics of the sender 80 can be sent to the remote party 90. For example, caller parameter imprint module 44 may impress upon the digital telephone line 62 the telephone number of user 80, whether user 80 is using A-law or mu-law, etc. Similar information may be impressed by the central office as it converts traditional analog calls into a digital format for transmission.

The output of caller parameter imprint module 44 is fed to a first binary switch 41, which selectively switches either A-law map 12 or mu-law map 43 into the digital line 62. Switch 41 is controlled remotely by manually operated switch 71 on user console 70. The output from either A-law map 12 or mu-law map 43 is fed to switch 42, a binary switch which selectively switches optional equipment not illustrated into or out of the digital line 62. Switch 42 is activated remotely by manually operated switch 72 on user console 70.

Alternative to a human user 80 and analog handset 78, user 80 could be a piece of digital equipment such as a computer (e.g., computer 56) or a facsimile machine. In this case, A/D converter 11 and D/A converter 15 would not be necessary.

Within receive equipment 50 and coupled to the incoming digital line 62 may be a caller parameter decipher module 51, which is capable of extracting caller parameter information that may have been impressed on the incoming signal 62. If present, this information is fed to computer 56, which places it into a format that is useful to the user 80, such as a video output on computer interface 75. Caller parameter decipher module 51 may not tell the receiver 50 which encoding format and modifications were used by the caller 90. Therefore, within receive equipment 50, the signal arriving from splitter/combiner 61 may be fed into a digital signal processor (DSP) 57, which may include a spectrum and/or statistical analyzer. Digital signal processor 57 may be already present in the digital telephone 60. DSP 57 can calculate spectrum characteristics, distortion, intermodulation, power, etc.

The purpose of the (optional) spectrum and/or statistical analyzer is to sample a portion of the incoming signal 62, such as a header portion, to try to determine certain characteristics of said signal, for example, whether A-law or mu-law is used on the incoming signal 62, and whether a quick fix 25 has been inserted onto said signal 62 by an international telephone company. The output of the spectrum analyzer is fed to computer 56, which compares the analysis of said portion of said signal provided by the spectrum analyzer with a set of prestored templates 58 corresponding to certain signal characteristics. For example, the set of templates 58 may comprise four templates, corresponding to the following four signals: a first signal in which A-law has been used with no quick fix; a second signal in which A-law has been used with a quick fix; a third signal in which mu-law has been used with no quick fix; and a fourth signal in which mu-law has been used with a quick fix. Computer 56 compares the inputs from templates 58 and the spectrum analyzer, and informs user 80 by means of computer interface 75 which of the prestored templates 58 most closely resembles the signal analyzed by the spectrum analyzer. This comparison may be performed by conventional techniques well known to those of ordinary skill in the art. Distortion measures and signal-to-noise ratio may also be used, and the process may be automated to exclude direct participation by user 80. If included, the statistical analyzer simply builds a histogram of received values and determines if particular values are over- or under-represented.

Un-quick-fix module 55 is selectively switched into the incoming digital telephone line 62 by means of switch 53, a binary switch remotely triggered by manually operated switch 74 on user console 70. The purpose of un-quick-fix module 55 is to reverse the effects of the insertion of a quick fix module 25 when it is known or suspected that an international telephone company has inserted quick fix 25 into the incoming signal. Thus, instead of adding the integer that is added by quick fix 25, the conversions introduced by the quick fix module 25 are reversed by subtracting the same integers from the digital representation of the information being sent. Because there are certain output values that have associated therewith two rather than one input value, the reverse map may not be unique, and randomization or noise shaping may be needed to complete the operation. Alternatively, for such ambiguous values, un-quick-fix module 55 can be designed to subtract an amount equal to the (arithmetic or geometric) average of the two amounts that would normally be added for the two input signals.

The incoming digital telephone signal is then coupled to either inverse A-law map 14 or inverse mu-law map 52 by means of binary switch 54, which is activated remotely by manually operated switch 73 on user console 70. The digital signal is then coupled through digital-to-analog converter 15 to speaker 77 within handset 78.

The equipment in FIG. 3 provides great flexibility in removing the problem of incompatibility between international telephone systems. For example, if the remote party 90 is calling user 80, there are several means available to user 80 to determine how to remove the incompatibilities. For example, if remote party 90 is using caller ID, caller parameter decipher module 51, in conjunction with computer 56, can decipher the caller ID and possibly determine whether A-law or mu-law is being used. User 80 can then activate switch 73 to make the correct selection between inverse A-law map 14 and inverse mu-law map 52. User 80 can also make an adjustment in send equipment 40 as well as receive equipment 50, by activating switch 71 to make the selection of A-law map 12 versus mu-law map 43, according to which law party 90 is using. Alternatively, the spectrum analyzer within DSP 57 may determine which law is being used, for example by measuring distortion on the modem tone by evaluating a predetermined test pattern that has been sent by remote party 90. As a third alternative, party 90 can tell user 80 which law he is using, and user 80 can activate the appropriate switches 71,73. The system may be automated so that computer 56 performs most or all of the functions that user 80 would otherwise perform. For example, computer 56 can be made to send signals over microphone 76 and to activate switches 71–74.

Similarly, when user 80 (or computer 56) originates the call, he (or she or it) will know what number he is dialing and therefore know the country of remote party 90, and thus know which law remote party 90 conventionally uses. User 80 (or computer 56) may then activate switch 73 to select the law 14,52 corresponding to that knowledge. He may also decide to switch to that same law 12,43 within his send equipment 40, despite the fact that he is not normally on that law, in order to help the remote party 90, who may not have as sophisticated a digital telephone 60 as does user 80.

If both user 80 and remote party 90 are equipped with the sophisticated digital telephone 60 illustrated in FIG. 3, they may decide to use just A-law or just mu-law or even a third system, such as in accordance with CCITT/ITU G.728 (7 kHz voice), in both their send and receive units 40,50 even if they are in countries using different laws.

In all of the above cases, the parties 80,90 still may need to determine whether one of the international telephone companies processing the connection has inserted a quick fix 25 or not. They may make this determination either by trial and error, i.e, trying various combinations of switches 72,74 to see which combination yields the best results; or they may make this determination by using spectrum or statistical signal analyzer within DSP 57 in conjunction with computer 56 and templates 58. If a quick fix 25 is in place, one and only one of the parties 80,90 should switch his un-quick-fix module 55 into the connection.

There are many opportunities for unwanted distortion to adversely affect the reception within receive equipment 50. For example:

1. The original signal compression as performed by compression map 12, 43 creates distortion because the output of map 12, 43 has coarser resolution than the input (i.e., the digital output signal has fewer bits than the digital input signal), and because the compression map 12, 43 is non-linear. Compression maps 12, 43 are non-linear because they are logarithmic. Spectral components are caused by beating between the harmonics of the digital signal and the sampling clock (typically 8 KHz) of the compression map 12, 43.

2. An additional source of distortion is "bit robbing", wherein the telephone company steals low-order bits from the digital signal to use in assisting the telephone company with conveying signaling information from one telephone switch to another. As used herein, the low-order bit is that bit that has the least impact on the amplitude excursion of the signal.

3. In an international telephone system, the conversion from A-law to mu-law, or vice versa, is an additional source of distortion. A-law and mu-law are not tailored for the transmission of data; they were designed before people put a lot of data over the telephone lines.

4. The portions of the telephone line between the user 80 and the remote party 90 that are analog constitute additional sources of noise and distortion.

5. Analog-to-digital converter 11 is an additional source of distortion.

Figure 4:
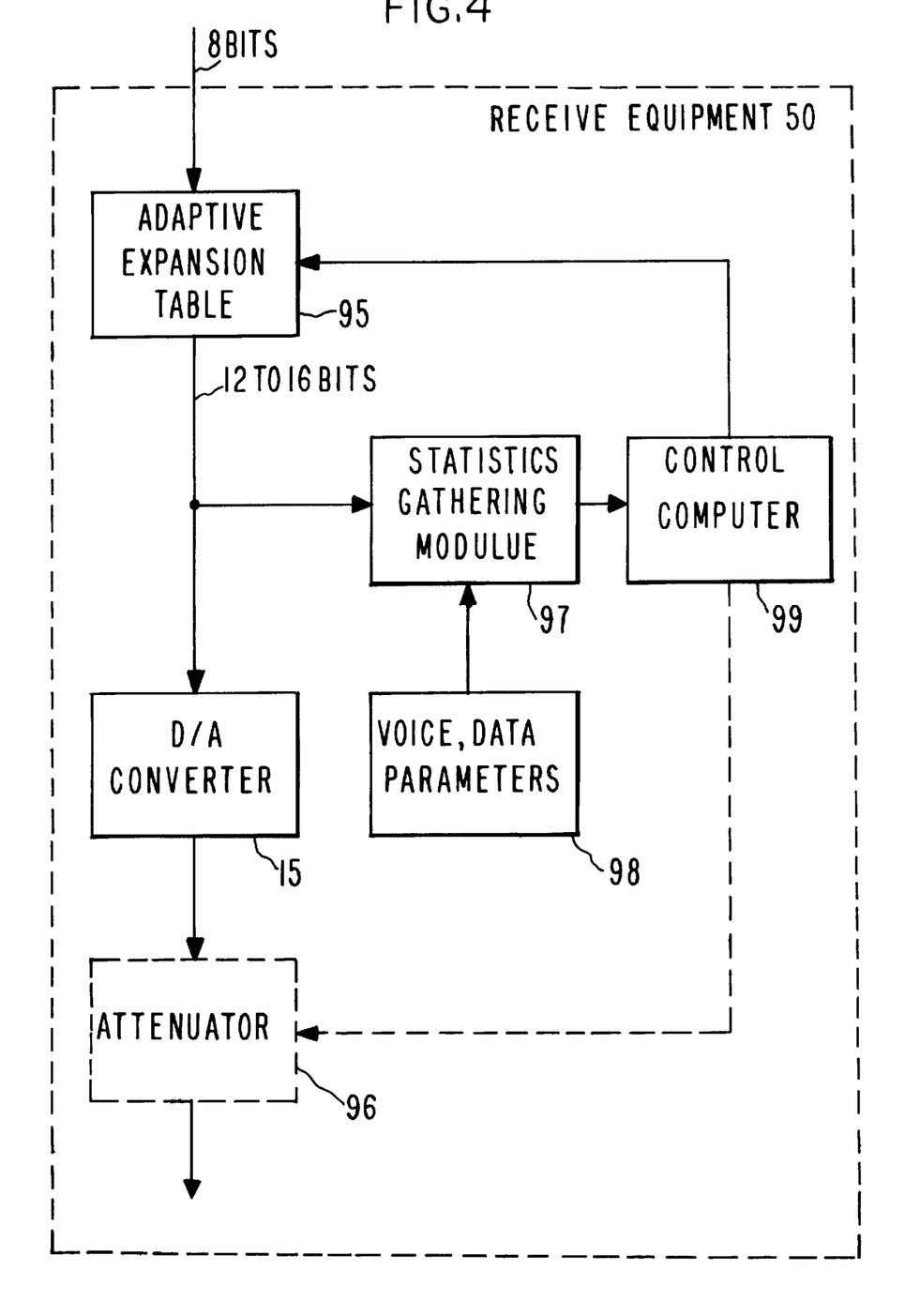
FIG. 4 is a block diagram illustrating a preferred embodiment of the present invention comprising an adaptive expansion table 95 and a control computer 99.

In an attempt to minimize this unwanted distortion, the present invention offers a preferred embodiment illustrated in FIG. 4, in which an adaptive expansion table 95 is used. Table 95 replaces items 14, 52, 53, 54, and 45 of FIG. 3. Table 95 is a more generalized version of inverse A-law map 14 or inverse mu-law map 52. Like these predecessor inverse maps 14, 52, table 95 expands the digital signal from (typically) 8 bits to a finer resolution of (typically) 12 to 16 bits. Table 95 is much more powerful than its predecessor inverse maps 14, 52, however, because the mapping within table 95 is arbitrarily general. Inverse A-law map 14 and inverse mu-law map 52 are merely special cases of the possible mappings within table 95. Furthermore, table 95 is adaptive in the sense that the mappings within table 95 can be made to change over time. Table 95 can be thought of as a map in which each of the 256 possible 8-bit input values is mapped to a selected 12 to 16 bit output value or values. Multiple output values are used in support of dithering or for noise/distortion smoothing.

Control computer 99 changes the configuration of table 95 in response to changing conditions or in response to being commanded by a human control operator 80. The changing conditions can be measured by statistics gathering module 97, which is coupled to the output of table 95 and to the input of control computer 99. Computer 99 can be programmed to change the configuration of table 95 when thresholds of certain parameters as gathered by module 97 have been met or exceeded. The parameters measured by module 97 can be voice and/or data parameters stored in parameters module 98. Module 98 can be embodied, for example, in read only memory (ROM).

The output of table 95 is fed to D/A converter 15 as before. The output of D/A converter 15 is an analog signal that is processed as before, e.g., fed to speaker 77.

Table 95 can be initialized to be configured as an inverse A-law map 14 or an inverse mu-law map 52. Similarly, if receive equipment 50 comprises a caller identification module as part of caller parameter decipher module 51, table 95 can be initialized based upon the most recent configuration that it had when it was communicating with the particular caller identified by the caller identification module. This information can be stored within computer 99.

Computer 99 operates at an examination rate to make its decisions as to whether to reconfigure table 95. Table 95 can have a randomized or dithered output as appropriate to enhance performance, typically by noise shaping or distortion smoothing. The examination rate can be the same clock speed as D/A converter 15 (sample by sample), or it can be at a slower tracking rate. The clock speed of D/A converter 15 is typically 8 KHz.

Typical samples of parameters stored in parameters module 98 are the peak-to-average ratio of the signal amplitude, and the preselected frequency or frequency range to be examined. These parameters can be changed and/or preselected by a human control operator 80. Based upon the preselected parameters, module 97 gathers statistics on the signal appearing at the output of table 95. For example, module 97 can measure the presence of certain frequency components resulting from distortion that are known to be annoying to the human ear. If frequencies are to be examined by module 97, module 97 can comprise one or more Fourier transform modules, e.g., Fast Fourier Transforms (FFTs).

Computer 99 can be programmed to lock table 95 at a given configuration for the duration of a particular telephone call when a pre-established quality threshold has been met or exceeded. For example, if the particular type of distortion measured by module 97 is at or below a certain value, said quality threshold is deemed to be met or exceeded.

Computer 99 can be programmed to disable the adaptive feedback loop (95 to 97 to 99 to 95) when a certain type of output, e.g., data as opposed to voice, has been detected. For example, upon detection of such a condition, either computer 99 directs the configuration of table 95 to be frozen at its then current value or else computer 99 directs table 95 to adapt a preselected configuration, e.g., that of inverse A-law map 14.

Similarly, computer 99 can be programmed to disable the adaptive feedback loop for signal amplitudes that fall beneath a certain preselected threshold. The utility of this feature is seen from the fact that distortion is normally more likely to be present at high amplitudes.

Statistics gathering module 97 can be made to measure entropy, e.g. using wavelets. In this case, computer 99 directs table 95 to assume a certain configuration when the measured entropy is at or below a preselected threshold. In this case, wavelet transforms are used to gather statistics, but not to process the signal.

Computer 99 can be programmed to sort the signal into one or more categories that have been preselected. For example, the four categories of high amplitude voice, low amplitude voice, tone-like data, and noise-like data can be preselected. Computer 99 determines which of the four categories of signal the actual signal most closely resembles, based upon measurements made by module 97. Computer 99 can make this determination and similar determinations using techniques of fuzzy logic, artificial intelligence, and/or neural programming. Computer 99 then directs table 95 to one of four preselected configurations corresponding to this determination.

An example of the operation of the present invention can be seen by examining the following Table 1, which gives amplitude values over time to illustrate to the correction of the expansion of a 1000 Hz tone sampled at 8000 Hz.

TABLE 1

| | TIME → | | | | | | | |
|---|---|---|---|---|---|---|---|---|
| A true sample (sine wave): | 0 | .70707 | 1 | .70707 | 0 | −.70707 | −1 | −.70707 |
| As rounded by a typical prior art phone system: | 0 | .7 | 1 | .7 | 0 | −.7 | −1 | −.7 |
| As corrected by this invention: | 0 | .71 | 1 | .71 | 0 | −.71 | −1 | −.71 |

At the output of D/A converter 15 is optional attenuator 96. When attenuator 96 is present, there is an additional feedback loop, i.e., from computer 99 to attenuator 96. Attenuator 96 can be a step attenuator having a series of steps covering zero to 25 dB attenuation. Attenuation is apt to be more useful when the output of table 95 is 12 bits than when said output is 16 bits. This is because when the lower resolution output is used, larger voltage steps divide up the given output voltage range. Computer 99 can be programmed to set the level of attenuation provided by attenuator 96 as a function of the resolution of the digital output signal emanating from table 95.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention. For example, laws other than A-law and mu-law can be employed. As another example, wavelet transforms could be used not just to gather statistics within module 97 as described above, but also to process the actual digital signal appearing at the output of table 95, by means of placing this signal into the frequency domain, processing it using techniques of digital signal processing to minimize distortion, then reconverting the signal back into the time domain.

What is claimed is:

1. A digital telephone apparatus comprising:

an adaptive expansion table having as an input a first digital signal comprising n bits and having as an output a second digital signal comprising m bits, where m is greater than n, such that the second digital signal has a resolution that is finer than the resolution of the first digital signal, said adaptive expansion table mapping each of $2^n$ possible input values of the first digital signal to a selected output value comprising m bits, said adaptive expansion table also being configurable to comprise one of a plurality of differing compression maps; and coupled to the adaptive expansion table, a controller adapted to change the configuration of the adaptive expansion table.

2. The apparatus of claim 1, further comprising a statistics gathering module coupled to the adaptive expansion table and to the controller; wherein the controller changes the configuration of the adaptive expansion table based upon statistics gathered by the statistics gathering module.

3. The apparatus of claim 2, further comprising a configurable set of parameters coupled to the statistics gathering module; wherein configuring the parameters within the configurable set of parameters determines which statistics are gathered by the statistics gathering module.

4. The apparatus of claim 1, further comprising a digital-to-analog converter coupled to the output of the adaptive expansion table.

5. The apparatus of claim 1, further comprising an attenuator coupled to the adaptive expansion table and to the controller; wherein the controller variably controls an amount of attenuation provided by the attenuator.

6. A method for reducing distortion in a digital telephone apparatus said method comprising the steps of:

providing an adaptive expansion table having as an input a first digital signal comprising n bits and having as an output a second digital signal comprising m bits, where m is greater than n, such that the second digital signal has a finer resolution than that of the first digital signal, said adaptive expansion table mapping each of $2^n$ possible input values of the first digital signal to a selected output value comprising m bits, said adaptive expansion table also being configurable to comprise one of a plurality of differing compression maps; and coupling to the adaptive expansion table a controller for changing the configuration of the adaptive expansion table in a manner that reduces distortion appearing at the input of the adaptive expansion table.

7. The method of claim 6 wherein the output of table 6 is randomized.

8. The method of claim 6, further comprising the step of coupling a statistics gathering module to the adaptive expansion table and to the controller; wherein the controller changes the configuration of the adaptive expansion table in response to statistics gathered by the statistics gathering module.

9. The method of claim 8, wherein the statistics gathering module measures entropy, and the controller directs the adaptive expansion table to assume a low entropy configuration when the entropy measured by the statistics gathering module is below a pre-selected threshold.

10. The method of claim 6, further comprising the step of coupling a digital-to-analog converter to the output of the adaptive expansion table, said digital-to-analog converter having a clock rate.

11. The method of claim 10, wherein, at an examination rate, the controller examines to see whether the configuration of the adaptive expansion table should be changed, said examination rate being substantially equal to the clock rate of the digital-to-analog converter.

12. The method of claim 10, wherein, at an examination rate, the controller examines to see whether the configuration of the adaptive expansion table should be changed, said examination rate being slower than the clock rate of the digital-to-analog converter.

13. The method of claim 6, wherein the controller refuses to change the configuration of the adaptive expansion table when at least one of a preselected set of criteria has been detected by the controller.

14. A method for a telephone end user to overcome incompatibility between a first telephone system using A-law and a second telephone system using mu-law when said telephone end user communicates with a remote party, connected to a telephone system other than the system of the telephone end user, over a telephone line, said method comprising the steps of:

determining the law that the remote party is using;

ascertaining whether an intervening telephone system coupled to said telephone line has inserted an incomplete solution for said incompatibility onto said telephone line; and selecting among a plurality of inverse maps, within receive equipment at the telephone end user's location, an inverse map corresponding to said remote party's law.

15. A method for a telephone end user to overcome incompatibility between a first telephone system using A-law and a second telephone system using mu-law when said telephone end user communicates with a remote party, connected to a telephone system other than the system of the telephone end user, over a telephone line, said method comprising the steps of:

determining the law that the remote party is using;

selecting, within send equipment at the telephone end user's location, a map corresponding to said remote party's law;

ascertaining whether an intervening telephone system coupled to said telephone line has inserted an incomplete solution for said incompatibility onto said telephone line; and selecting, within receive equipment at the telephone end user's location, an inverse map corresponding to said remote party's law.

16. The method of claim 14, or claim 15 wherein the determining step comprises deciphering caller ID information that the remote part has sent to the telephone end user.

17. The method of claim 15 or claim 16 wherein the determining step comprises the telephone end user verbally interrogating the remote party.

18. The method of claim 15 or claim 16 wherein the determining step comprises using a digital signal processor to evaluate a predetermined test pattern that has been sent by the remote party.

19. The method of claim 15 or claim 16 further comprising the step of extracting caller parameter information that may have been impressed onto said telephone line.

20. The method of claim 19, further comprising the step of switching into said line, at the telephone end user location, circuitry to counter said incomplete solution.

21. The method of claim 19, further comprising the step of switching into said line, at the location of the remote party, circuitry to counter said incomplete solution.

22. The method of claim 19 wherein the ascertaining step comprises measuring a test pattern with a spectrum analyzer; and comprising said test pattern with a set of pre-stored templates.

23. The method of claim 19 wherein the ascertaining step comprises a trial-and-error method.

24. The method of claim 19 wherein the ascertaining step comprises buidlling a histogram of received values; and determining from the histogram if a selected value meets a representation criterion.

* * * * *